(12) United States Patent
Cosentino et al.

(10) Patent No.: US 11,641,306 B1
(45) Date of Patent: May 2, 2023

(54) DYNAMIC RUNTIME APPLICATION INTEGRATION

(71) Applicant: Red Hat, Inc., Raleigh, NC (US)

(72) Inventors: Andrea Cosentino, Milan (IT); Paolo Antinori, Milan (IT)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/592,123

(22) Filed: Feb. 3, 2022

(51) Int. Cl.
*G06F 15/177* (2006.01)
*H04L 41/0803* (2022.01)
*H04L 41/0893* (2022.01)
*H04L 41/12* (2022.01)

(52) U.S. Cl.
CPC ...... *H04L 41/0803* (2013.01); *H04L 41/0893* (2013.01); *H04L 41/12* (2013.01)

(58) Field of Classification Search
CPC .. H04L 41/0803; H04L 41/0893; H04L 41/12
See application file for complete search history.

(56) References Cited

U.S. PATENT DOCUMENTS

| 7,234,132 | B2 | 6/2007 | Lam |
| 7,861,248 | B2 | 12/2010 | Zhang et al. |
| 8,316,386 | B2 | 11/2012 | Kumar et al. |
| 9,244,949 | B2 | 1/2016 | Jin et al. |
| 9,400,647 | B2 | 7/2016 | Gonsalves |
| 9,800,689 | B2 | 10/2017 | Said et al. |

FOREIGN PATENT DOCUMENTS

JP 2007304681 A 11/2007

OTHER PUBLICATIONS

Author Unknown; Integration Framework; 4 pgs; Retrieved from https://www.next4biz.com/integration-framework/ on Jan. 7, 2022.
Author Unknown; Middleware Offers Integration Framework for Dynamic UAV Applications; Aug. 1, 2009; 8 pgs; Retrieved from https://www.aerodefensetech.com/component/content/article/adt/features/articles/5581 on Jan. 7, 2022.

*Primary Examiner* — Wing F Chan
*Assistant Examiner* — Joseph R Maniwang
(74) *Attorney, Agent, or Firm* — K&L Gates LLP (57) ABSTRACT

Systems and techniques for dynamic runtime application integration are generally described. A set of source nodes may be determined for a first compute service. A source node priority score may be determined for each source node. A first destination node priority score may be determined for a first destination node for the first compute service. The source node priority score for a first source node and the first destination node priority score may be combined to determine a first priority score. The source node priority score for a second source node and the first destination node priority score may be combined to determine a second priority score. A first data pathway from the first source node to the first destination node may be prioritized based at least in part on a comparison of the first priority score and the second priority score.

20 Claims, 5 Drawing Sheets

DYNAMIC RUNTIME APPLICATION INTEGRATION

BACKGROUND

Application integration refers to the process of enabling independently designed applications to function together. This includes maintaining consistency of files and other copies of data and providing access to data and consistent functionality through a single interface or application service. Additionally, application integration may involve orchestrating the integrated flow of multiple activities performed by disparate applications. Application integration involves optimizing data and workflows between multiple software applications. Application integration is an on-going process as interconnected software applications are updated and/or replaced overtime.

SUMMARY

The present disclosure provides new and innovative systems and methods for dynamic runtime application integration. In an example, a method includes determining a set of source nodes. In various examples, each source node of the set of source nodes may be designated as a data source for a first compute service. In some further examples, the method may include determining, for a first source node of the set of source nodes, a first source node priority score based at least in part on a first amount of data to be sent to the first compute service by the first source node. In yet other examples, the method may include determining, for a second source node of the set of source nodes, a second source node priority score based at least in part on a second amount of data to be sent to the first compute service by the second source node. In some cases, the method may include determining, for a first destination node designated to receive data from the first compute service, a first destination node priority score based at least in part on a compute load on the first destination node. In various examples, the method may include combining the first source node priority score and the first destination node priority score to determine a first priority score. In still other examples, the method may include combining the second source node priority score and the first destination node priority score to determine a second priority score. In various other examples, the method may include prioritizing a first data pathway from the first source node to the first destination node based at least in part on a comparison of the first priority score and the second priority score.

In an example, a system includes a first compute service and an integration service. The integration service may include at least one processor. In various examples, the at least one processor may be effective to determine, for the first compute service, a set of source nodes. In various examples, each source node of the set of source nodes may be designated as a data source for the first compute service. In various examples, the at least one processor may be effective to determine, for a first source node of the set of source nodes, a first source node priority score based at least in part on a first amount of data to be sent to the first compute service by the first source node. In various examples, the at least one processor may be effective to determine, for a second source node of the set of source nodes, a second source node priority score based at least in part on a second amount of data to be sent to the first compute service by the second source node. In various examples, the at least one processor may be effective to determine, for a first destination node designated to receive data from the first compute service, a first destination node priority score based at least in part on a compute load on the first destination node. In some other examples, the at least one processor may be effective to combine the first source node priority score and the first destination node priority score to determine a first priority score. In still other examples, the at least one processor may be effective to combine the second source node priority score and the first destination node priority score to determine a second priority score. In some examples, the at least one processor may be effective to prioritize a first data pathway from the first source node to the first destination node based at least in part on a comparison of the first priority score and the second priority score.

In some examples, a non-transitory machine-readable medium may store a program which, when executed by a processor, may be effective to determine, for a first compute service, a set of source nodes. In various examples, each source node of the set of source nodes may be designated as a data source for the first compute service. In various examples, the program, when executed by the processor, may be further effective to determine, for a first source node of the set of source nodes, a first source node priority score based at least in part on a first amount of data to be sent to the first compute service by the first source node. In various examples, the program, when executed by the processor, may be further effective to determine, for a second source node of the set of source nodes, a second source node priority score based at least in part on a second amount of data to be sent to the first compute service by the second source node. In various examples, the program, when executed by the processor, may be further effective to determine, for a first destination node designated to receive data from the first compute service, a first destination node priority score based at least in part on a compute load on the first destination node. In various examples, the program, when executed by the processor, may be further effective to combine the first source node priority score and the first destination node priority score to determine a first priority score. In various examples, the program, when executed by the processor, may be further effective to combine the second source node priority score and the first destination node priority score to determine a second priority score. In various examples, the program, when executed by the processor, may be further effective to prioritize a first data pathway from the first source node to the first destination node based at least in part on a comparison of the first priority score and the second priority score.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Integrating functionality of independently designed applications often requires data mapping, application programming interface design and/or standardization, event triggering, etc. Typically, in order to perform application integration (e.g., by adding and/or removing applications) a compute service is taken offline in order to test, prioritize, and/or enable possible integrations. Application integrations may include new data source nodes (e.g., applications that can serve as data sources for a given compute service) as well as new destination nodes (e.g., applications to which the compute service sends data), among other possible integrations.

Autodiscovery of potential new applications for integration typically involves stopping the compute service and polling the candidate source nodes and destination nodes to identify new candidate nodes (e.g., a new S3 data source that has been defined, a new Java Message Service (or other messaging service) queue to which to write data, etc.). Once the discovery process is concluded and potential new data source nodes and/or destination nodes are identified, integration templates are defined to specify parameters such as network addresses of the source nodes/destination nodes (e.g., hypertext transfer protocol (HTTP) endpoints), data paths, conditions (e.g., retrieve data from "Folder A" if condition X is met, otherwise retrieve data from "Folder B"), etc.

In various previous approaches, parameters may be determined for candidate source nodes and/or destination nodes by stopping the relevant compute service (e.g., the application for which the source nodes and/or destination nodes are being considered for integration), querying the candidate source nodes and/or destination nodes for the appropriate metadata (e.g., latency information (from response time), processing capability, amount of data to be read, etc.). The metadata received may be used to design integration templates by manually specifying the integration template parameters based on the metadata received from the candidate source/destination nodes. Such an approach causes interruption of service in order to query and design the integration templates used to integrate the new source/destination nodes.

Described herein are various systems and techniques that may be used to implement an integration service that performs automatic discovery of new data sources and/or destinations in the ecosystem of the compute service during runtime. Additionally, the systems and techniques described herein may prioritize and/or integrate the highest priority source/destination nodes and/or data pathways without interrupting service by querying live metadata used to populate integration templates using live traffic. As described herein, integration/deployment may be prioritized to maximize budget usage and/or to optimally meet service level agreements.

A network broadcast message may be used to identify candidate source nodes and/or destination nodes (e.g., current source/destination nodes as well as new candidate source/destination nodes for the compute service using the integration service). The integration service may generate a graph identifying each data source node and data sink nodes (including newly-discovered nodes that have not yet been integrated). Priority values are determined for each source node and destination node individually. Priority computation may be defined based on the particular compute service for which integration is being performed. In one example, source node priority computation may include determining an amount of data to be consumed (from the subject source node) by the application service. In such an example, candidate source nodes with more data may be assigned a higher priority relative to candidate source nodes with a lower amount of data to be read. In some other examples, there may be different classes of data with some classes of data (defined by the compute service) having a higher priority relative to others.

Similarly, destination node priority may be computed by the integration service. The destination node priority may be defined by the compute service (e.g., via an integration service API). In some examples, destination node priority may be based on latency between the compute service and the candidate destination node, memory load of the destination node, processor load (e.g., central processing unit (CPU) load) of the destination node, disk load (e.g., read/write speed) of the destination node, etc. The particular priority computation logic may be defined for the integration service via an integration service API (e.g., by the developers of the compute service for which integration is being performed). Additionally, the integration service may query the candidate nodes for various information such as HTTP endpoints, ports, etc., so that integration templates may be populated by the integration service during runtime.

The graph generated by the integration service may connect each candidate source node with each candidate destination node along an "edge" (e.g., a data pathway). Priority scores may be computed for each edge by adding the source node priority score and the destination node priority score, as described in further detail below. Higher priority scores for an edge indicate that the source and destination nodes for the edge have a higher deployment priority relative to lower edge priority scores for other edges. A threshold priority score may be used to prioritize and/or optimize deployment of data pathways, source nodes, and/or destination nodes during integration. For example, the threshold priority score may be representative of a cloud-computing budget, service level agreements, and/or other compute requirements for the compute service undergoing integration. The source/destination node deployments may be selected according to the edge priority. In addition, the edges may be selected that optimize deployment (e.g., by deploying the highest priority edges which come as close to the threshold priority score as possible, without exceeding the threshold priority score). For example, if the threshold priority score is related to performance thresholds, overprovisioning of the compute service may cause performance degradation if the threshold priority score is exceeded. Additional examples are described below in reference to the figures.

The integration service may perform the source/destination node discovery process and prioritization iteratively (e.g., based on a recurring time period and/or based on some other specified metric being met) so that new candidate source/destination nodes are discovered and/or deployed over time according to changing priority scores and/or a changing set of candidate source/destination nodes. Accordingly, the graph of source/destination nodes and the various priority scores generated by the integration service may be updated over time. During each iteration, a subset of the source/destination nodes may be deployed (depending on the threshold priority score and the number of candidates). The source/destination nodes selected for deployment may be polled by the integration service during runtime for the relevant metadata used to populate the integration template(s). The specific integration template(s) and/or metadata may be specified via an API of the integration service, according to the desired integration.

The compute service availing itself of the integration service may be any type of compute service. A few, non-exhaustive examples may include content delivery networks (CDNs), Video Analytics as a Service, Retail as a Service, networked storage services, etc. Compute services may be deployed across a multitude of compute nodes. Each service may have different compute resource requirements such as compute capacity, network latency, cache and storage requirements, etc. In some cases, compute resources for a compute service may be deployed within a cluster of compute nodes. A cluster of compute nodes, as used herein, refers to compute nodes on which an orchestration framework has been deployed (e.g., Kubernetes®, Docker Swarm®, etc.).

In some examples, a compute service may be a distributed service with various processes of the service being performed by different compute instances. For example, clusters of containers may deploy one or more services of a compute service that is seeking integration. Clusters of compute services may be managed using a container orchestration service such as Red Hat® OpenShift®, Kubernetes®, etc., and may be designed to be application agnostic.

Figure 1:
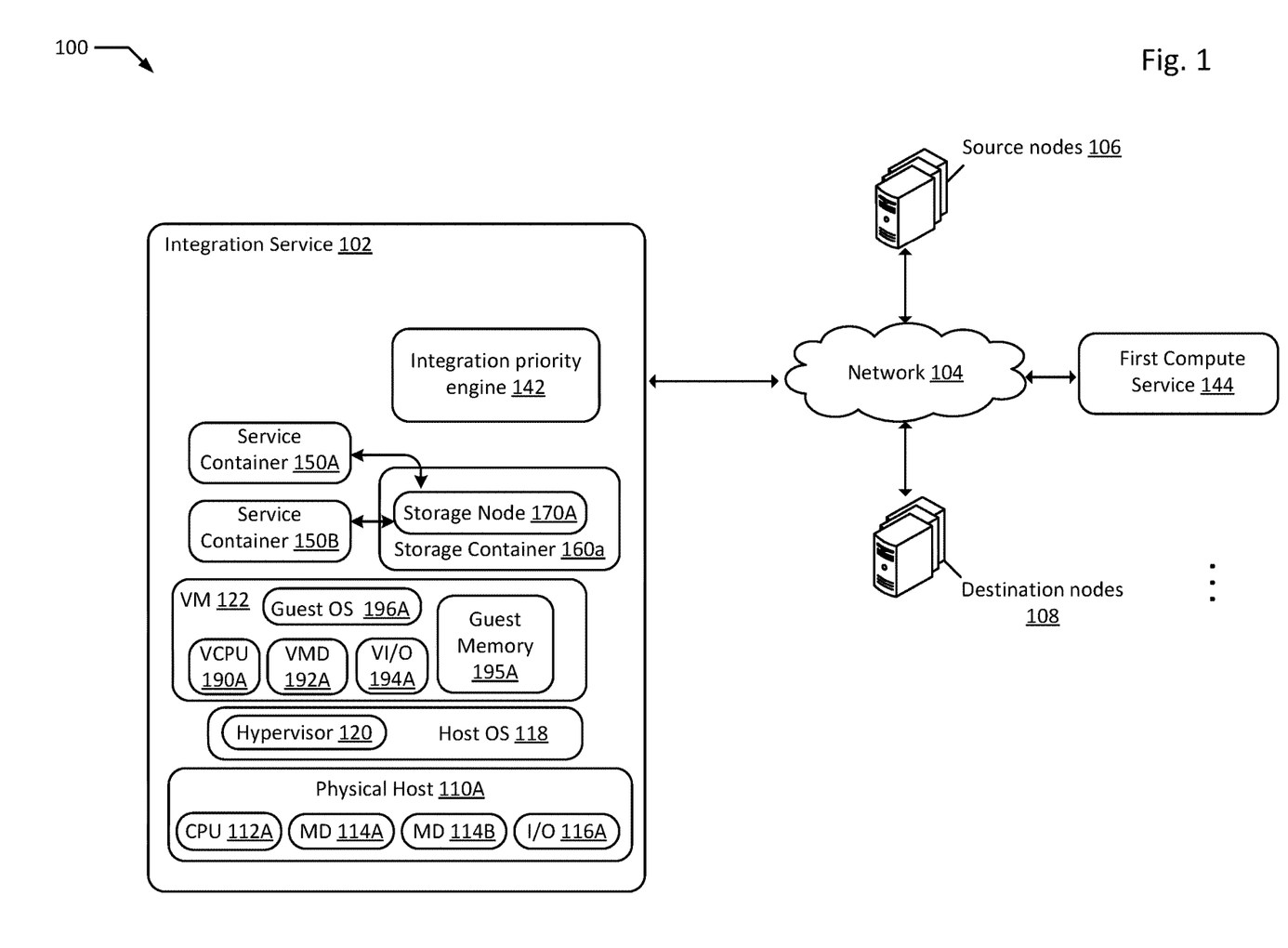
FIG. 1 is a block diagram of an integration service configured to integrate one or more source nodes and/or destination nodes for a first compute service, according to various examples of the present disclosure.

FIG. 1 is a block diagram of a system 100 including a first compute service 144 configured in communication with integration service 102. As described in further detail below, the integration service 102 may send a discovery request (e.g., a network broadcast message) that requests all candidate source nodes 106 and/or destination nodes 108 to all devices, subnetworks, and/or systems communicating with integration service over network 104 (and/or to a set of endpoints defined by the first compute service 144). Network 104 may be, for example, a wide area network (WAN) such as the Internet, a local area network (LAN), and/or some combination of networks, depending on the implementation.

In response, data identifying a set of candidate source nodes 106 and/or a set of candidate destination nodes 108 may be returned to integration service 102. The set of candidate source nodes 106 may include both current source nodes for first compute service 144 (e.g., data sources that are currently integrated into first compute service 144) as well as candidate source nodes for integration with first compute service 144. Similarly, the set of destination nodes 108 may include both current destination nodes (sometimes referred to as "targets," "sinks," or "data sinks") that are integrated with first compute service 144 as well as candidate destination nodes for integration. As described in further detail below, the integration service 102 may execute an integration priority engine 142. The integration priority engine 142 may determine priority scores for each source node of source nodes 106 and/or for each destination node of destination nodes 108. The logic used to calculate the priority scores may be supplied by the first compute service 144 and/or may be selected from one or more priority score generation logic templates of the integration service 102. Various metadata used by the specified logic to generate the priority scores may be requested from the individual source nodes 106 and destination nodes 108 by integration priority engine 142 and/or another component of integration service 102. In various examples, the parameters needed to compute the priority scores may be specified by the first compute service 144. In other examples, if a priority score generation logic template is selected, the parameters may be specified by the template. Accordingly, the integration priority engine 142 (or some other component) may request the specific metadata needed for priority score computation from the source nodes 106 and destination nodes 108.

The integration service 102 may generate graph data representing each source node of source nodes 106 and each destination node of destination nodes 108. A priority score may be generated for each edge (e.g., each data pathway) between each source node and each destination node in the graph data by adding the priority score associated with the source node and the destination node connected by the edge. The integration service 102 may prioritize deployment of new source nodes and/or new destination nodes using the edge priority scores and based on a threshold priority score. The threshold priority score may represent a budget associated with the first compute service 144 and may be specified via an API of the integration service 102 so that the integration service 102 may optimize the deployment of the various source nodes 106 and/or destination nodes 108 during runtime of the first compute service in a way that is optimal for the budget of the first compute service 144 and which prioritizes the most important source nodes and destination nodes according to the logic selected by the first compute service.

In the example depicted in FIG. 1, the integration service 102 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")).

Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers). In an example, a container (e.g., storage container 160a, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160a and/or service containers 150A-B may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VMexecuting on physical host 110A.

Integration service 102 may run one or more VMs (e.g., VMs 122), by executing a software layer (e.g., hypervisor 120) above the hardware and below the VM 122, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VIVID") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 122 may be a virtual machine and may execute a guest operating system 196A which may utilize the underlying VCPU 190A, VIVID 192A, and VI/O 194A. Processor virtualization may be implemented by the hypervisor 120 scheduling time slots on physical CPUs 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A. In an example, storage container 160a and/or service containers 150A, 150B may be similarly implemented.

In an example, in addition to distributed storage provided by storage container 160a, a storage controller may additionally manage data grid storage in dedicated storage nodes (e.g., NAS, SAN, etc.). In an example, a storage controller may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to an orchestrator. In the example, a storage controller may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters.

Figure 2:
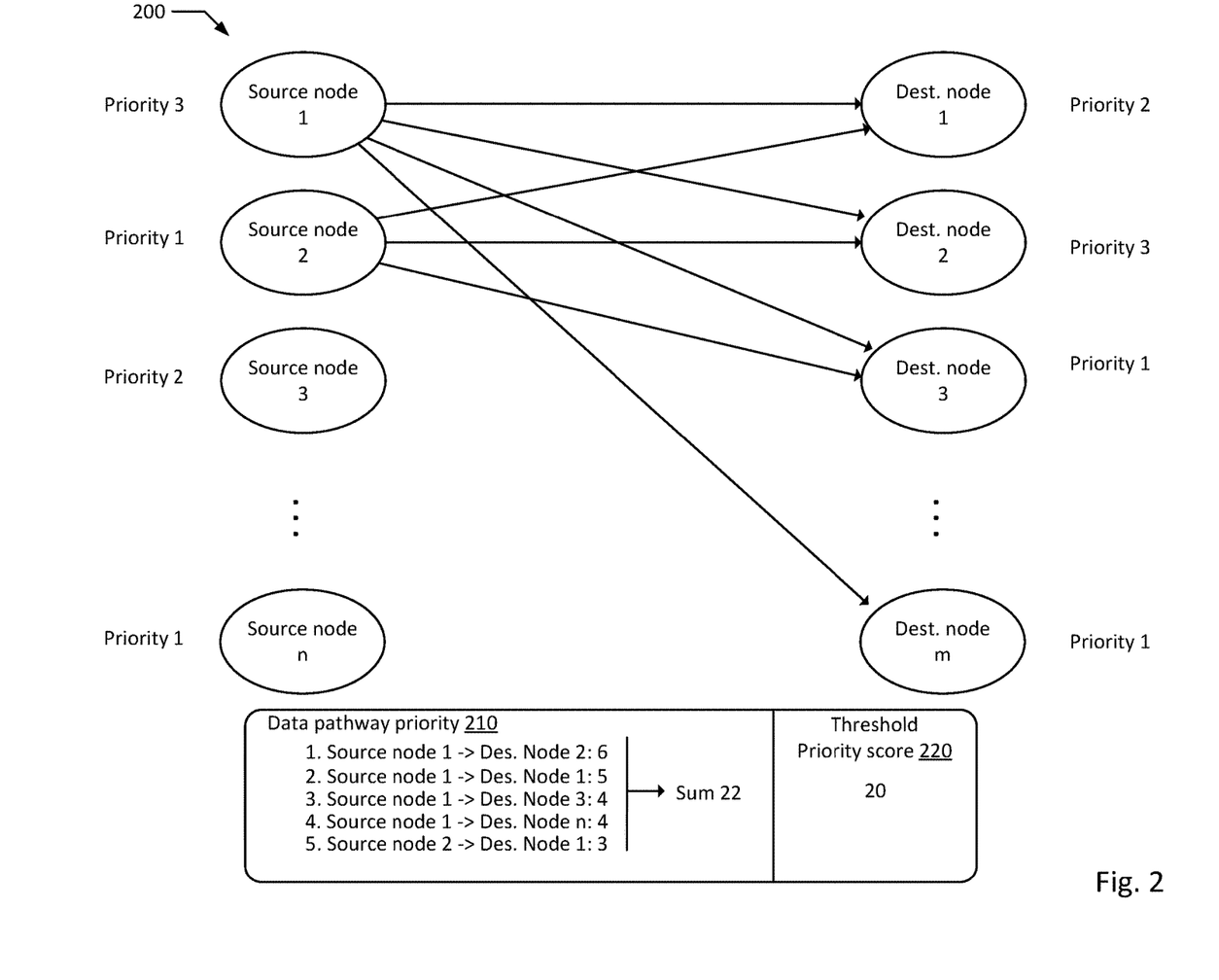
FIG. 2 illustrates priority determination for application integration of a set of source nodes and destination nodes, according to various examples of the present disclosure.

FIG. 2 illustrates an example 200 of priority determination for application integration of a set of source nodes (e.g., Source nodes 1, 2, . . . , n) and destination nodes (e.g., Dest. nodes 1, 2, . . . , m), according to various examples of the present disclosure. As previously described, integration service 102 may send a discovery request to determine an updated set of candidate source nodes and/or destination nodes. The discovery request may be specified using an API of the integration service. For example, the discovery request may include instructions to scan a local file system (of a recipient of the request) for any new folders that follow a specified pattern. In another example, the discovery request may search a database for newly-added tables (e.g., since the last request). The discovery request may request all HTTP endpoints that represent services or resources. The discovery request may request a list of buckets available on an Amazon Web Services (AWS) S3 server (using an AWS API). The discovery request may request a list of available topics pertaining to a Kafka message broker. The discovery request may request all hosts communicating on a local network (e.g., a multicast message may be sent over the local network to discover available hosts). The discovery request may be a request for all Twitter users that mention a particular name or event within a specified past time period (e.g., Twitter's API may be used to monitor a hashtag to determine all users using the hashtag). The foregoing auto-discovery requests are merely examples. The particular discovery requests used are highly implementation specific and may thus take a nearly limitless number of forms. In general, the discovery request logic may be specific to the first compute service 144 and may be specified using an API of the integration service 102.

In the example depicted in FIG. 2, a visual representation of graph data generated by integration priority engine 142 is shown. In the graph data, a priority score is assigned to each source node (e.g., of source nodes 1 . . . n) and to each destination node (e.g., of destination nodes 1 . . . m). For example, Source node 1 has received a priority score of 3, Source node 2 has received a priority score of 1, Source node 3 has received a priority score of 2, and source node n has received a priority score of 1. Similarly, destination node 1 has received a priority of 2, destination node 2 has received a priority score of 3, destination node 3 has received a priority score of 1, and destination node m has received a priority score of 1. The particular logic used to compute the priority scores is implementation dependent. In general, the logic used to compute the priority scores for source nodes may be independent of the logic used to compute the priority scores for destination nodes. Each candidate source node and destination node may be queried to determine metadata relevant to priority computation for that node (according to the specific priority computation logic being employed).

In various examples, source node priority computation may include determining an amount of data to be consumed (from the subject source node) by the application service. In such an example, candidate source nodes with more data may be assigned a higher priority relative to candidate source nodes with a lower amount of data to be read. In some other examples, there may be classes of data with some classes of data (defined by the compute service) having a higher priority relative to others.

Similarly, destination node priority may be computed by the integration service. The destination node priority may be defined by the compute service (e.g., via an integration service API). In some examples, destination node priority may be based on latency between the compute service and the candidate destination node, memory load of the destination node, processor load (e.g., central processing unit (CPU) load) of the destination node, disk load (e.g., read/write speed) of the destination node, etc. The particular priority computation logic may be defined for the integration service via an integration service API (e.g., by the developers of the compute service for which integration is being performed).

Other strategies/logic for source destination node priority may be used apart from those specifically mentioned herein. Other example information that may be used to determine source/destination node priority scores may include explicit configuration data (e.g., System A is always prioritized over System B). Other example information that may be used to determine source/destination node priority scores may include querying the cardinality of available records from the subject node(s) and assigning higher priority to nodes with a cardinality below a particular threshold. Other example information that may be used to determine source/destination node priority scores may include prioritizing cloud-based systems with lower cost. Other example information that may be used to determine source/destination node priority scores may include prioritizing services that are able to maximize network throughput (e.g., by sending test packets and/or determining network traffic statistics for the different candidate source/destination nodes). Other example information that may be used to determine source/destination node priority scores may include querying classes of hardware (e.g., for destination nodes) to give priority to nodes with higher performing hardware classes. Other example information that may be used to determine source/destination node priority scores may include determining content of data transferred from the source and/or to the destination to determine higher priority for specific data (e.g., in Internet of Things scenarios, higher priority may be given to device instructions relative to data points provided by sensors). Note that the foregoing examples are non-exhaustive and that the priority determination logic and/or the metadata used to compute the source/destination node priority scores using such logic is highly implementation specific. Accordingly, the priority determination logic and the metadata used to compute the source/destination node priority scores using such logic is not limited to the specific examples used herein—which are for illustrative purposes only.

The graph data illustrated in FIG. 2 and determined by integration priority engine 142 may include an edge representing a data pathway between each source node and each destination node. A priority score may be calculated for each such data pathway by adding the priority score for the source node and the priority score for the destination node that are connected by the edge/data pathway. For example, in FIG. 2, the data pathway priority 210 has been calculated for the various edges/data pathways in the example 200. For example, for the edge connecting Source node 1 to Destination node 1, the source node priority score for Source node 1 (priority score 3) is added to the destination node priority score for Destination node 1 (priority score 2) resulting in a priority score for the edge/data pathway of 5 (3+2=5). Similarly, for the edge connecting Source node 1 to Destination node 2, the source node priority score for Source node 1 (priority score 3) is added to the destination node priority score for Destination node 2 (priority score 3) resulting in a priority score for the edge/data pathway of 6 (3+3=6).

The integration priority engine 142 determines a ranked list of the edge/data pathway priority scores. In the example, the data pathway between Source node 1 and Destination node 2 has the highest priority score (priority score 6), followed by the data pathway between Source node 1 and Destination node 1 (priority score 5), and so on. In the depicted example, the five priority scores shown among the data pathway priority 210 (the data pathway priority scores numbered 1-5) shown have a total priority score sum of 22. The threshold priority score 220 (e.g., a current budget for the compute service for which integration is being considered) is 20. Accordingly, the total priority score exceeds the threshold priority score 220. Deployment decisions may be made on the basis of the threshold priority score 220. For example, the data pathway between source node 2 and destination node 1 (data pathway priority score of 3) may be delayed (e.g., data transmission may be delayed along this pathway) and/or not integrated during the current iteration of the integration service 102 so that the sum of the deployed data pathway priority scores is less than the threshold priority score 220. In this example, the lowest priority data pathway has not been deployed so that the threshold priority score 220 is not exceeded. It should be noted that this data pathway may have a different priority in a later iteration and may be deployed at that time as priority scores for both source/destination nodes and data pathways may be recomputed at each iteration. The priority scores (for both individual nodes and pathways) may change as the various metadata changes (e.g., as the compute load is updated over time, as the amount of data to be transferred is updated, etc.).

In some cases, prioritization based on the data pathway priority scores may include optimization of traffic and/or source/destination node usage based on the computed priority scores. For example, an optimization problem may be solved using the relevant priorities as inputs and subject to the constraint of the threshold priority score 220 to determine an amount which to employ each source node, destination node, and/or data pathway to maximize a current deployment budget. The particular prioritization techniques used may depend on the implementation.

Figure 3:
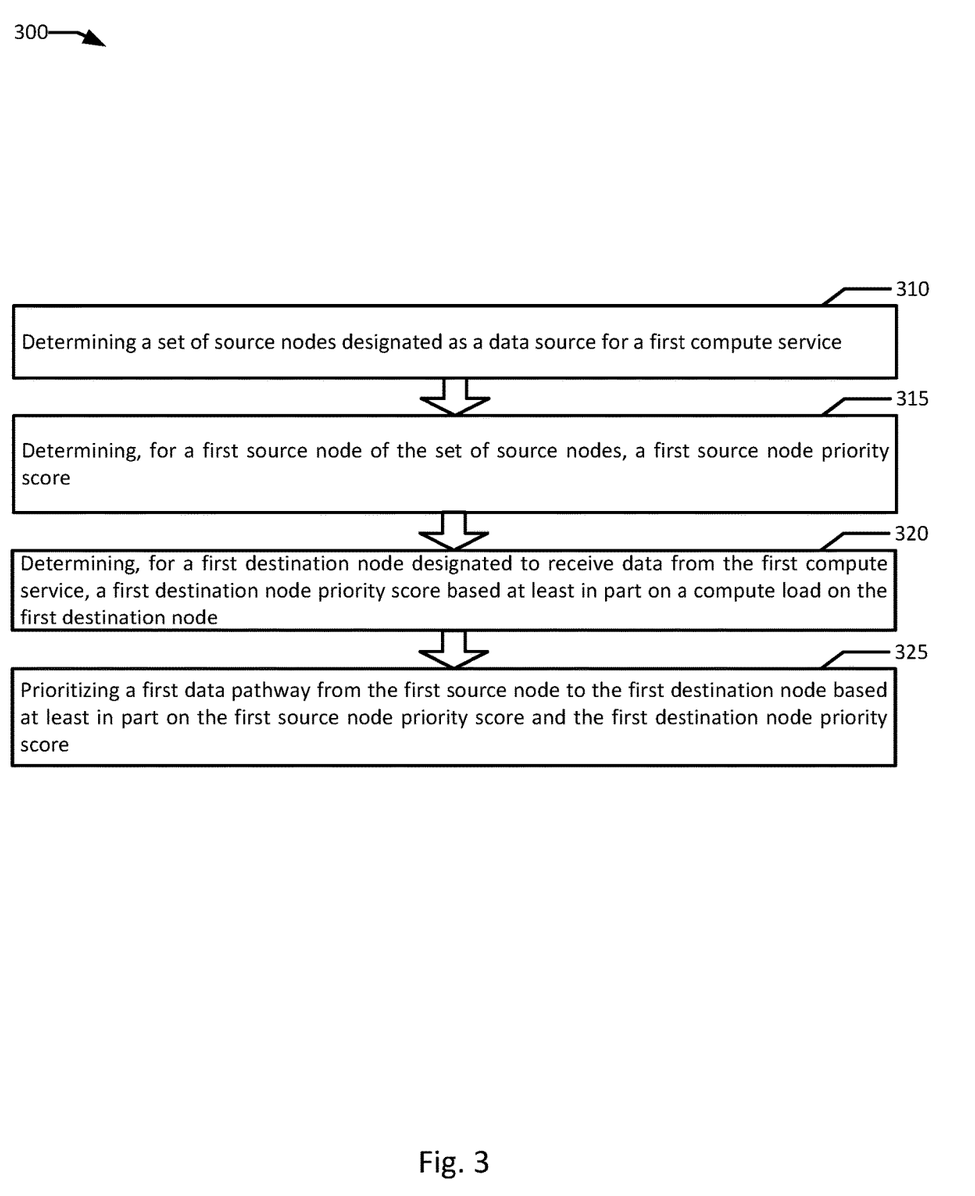
FIG. 3 is flowchart illustrating an example process for dynamic runtime application integration, according to an example of the present disclosure.

FIG. 3 is flowchart illustrating an example process 300 for dynamic runtime application integration, according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes determining, by integration service 102, a set of source nodes designated as a candidate data source for a first compute service (block 310). For example, the integration service 102 may send a request over a network to determine a list of potential source node candidates for integration during runtime of a compute service. Various examples of such discovery requests are described above, although the particular requests used may depend on the desired implementation and the particular compute service for which integration is being sought.

The example process 300 may further include determining, for a first source node of the set of source nodes, a first source node priority score (block 315). As previously described, the first source node priority score may be determined using logic that is specified via an API of the integration service 102. The logic may be predefined logic made available by the integration service 102 and/or custom logic specified by the compute service that is interacting with the integration service 102 for integration. For example, source nodes may be prioritized based on the number of records within a particular file repository, the cardinality of records, the latency of a source node, the throughput, a class of hardware of the source node, a priority given to various types of services and/or to different source nodes, etc. In general, the first source node priority score may be a numerical score assigned to the first node for purposes of determining priority of deployment during integration. In some examples, other source node priority scores may be determined. For example, the process 300 may include determining, for a second source node of the set of source nodes, a second source node priority score. As previously described, the second source node priority score may be determined using logic that is specified via an API of the integration service 102. The logic may be predefined logic made available by the integration service 102 and/or custom logic specified by the compute service that is interacting with the integration service 102 for integration. For example, source nodes may be prioritized based on the number of records within a particular file repository, the cardinality of records, the latency of a source node, the throughput, a class of hardware of the source node, a priority given to various types of services and/or to different source nodes, etc. In general, the first source node priority score may be a numerical score assigned to the first node for purposes of determining priority of deployment during integration. In some examples, the logic used to determine the priority score for each source node of the set of discovered source nodes may be the same for a given iteration.

The example process 300 may further include determining, for a first destination node designated to receive data from the first compute service, a first destination node priority score based at least in part on a compute load on the first destination node (block 320). In various examples, the compute load on candidate destination nodes may affect the ability of the destination nodes to process data at an acceptable rate for the first compute service (e.g., to meet one or more service level requirements). The compute load may be related to the amount of data processed by the candidate destination node per unit time, the hardware class of the destination node, the current CPU load, memory load, input/output load, etc., of the destination node. The priority score for the destination node may be a numerical score.

In some examples, the example process 300 may further include combining the first source node priority score and the first destination node priority score to determine a first priority score. For example, the first source node priority score and the first destination node priority score may be added to determine the priority score for the data pathway between the first source node and the first destination node. Similarly, in some examples, process 300 may further include combining the second source node priority score and the first destination node priority score to determine a second priority score. For example, the second source node priority score and the first destination node priority score may be added to determine the priority score for the data pathway between the second source node and the first destination node.

The example process 300 may further include prioritizing a first data pathway from the first source node to the first destination node based at least in part on the first source node priority score and the first destination node priority score (block 325). For example, first source node priority score and the first destination node priority score may be combined to determine the priority score for the data pathway between the first source node, through the compute service, to the first destination node. Similarly, data pathway priority scores may be determined between each candidate source node and each candidate destination node by combining the relevant source node priority score with the relevant destination node priority score for the subject candidate data pathway. The data pathway priority scores may be compared with one another to determine priority. For example, the first priority score determined for the first data pathway from the first source node to the first destination node may be higher than the second priority score determined for a second data pathway from the second source node to the first destination node. Accordingly, the first data pathway may be prioritized for deployment for the first compute service with respect to the second data pathway. Prioritization may take a variety of forms depending on the implementation logic. For example, the first data pathway may be deployed in the current iteration of integration performed by the integration service 102 while the deployment of the second data pathway may be delayed until the relative priority score of the second data pathway is higher relative to other data pathway priority scores. In some examples, the time and/or usage of the nodes of the second data pathway may be limited according to the relative priority scores of the data pathways. For example, if the first priority score is twice the second priority score, the services of the first data pathway may be used twice as much as the services associated with the second data pathway (note that this relationship need not be directly proportional and the relative usage may depend on the prioritization logic used). The prioritization logic may be supplied by an API of the integration service 102 and/or may be selected from predefined logic stored in memory of the integration service 102.

Figure 4:
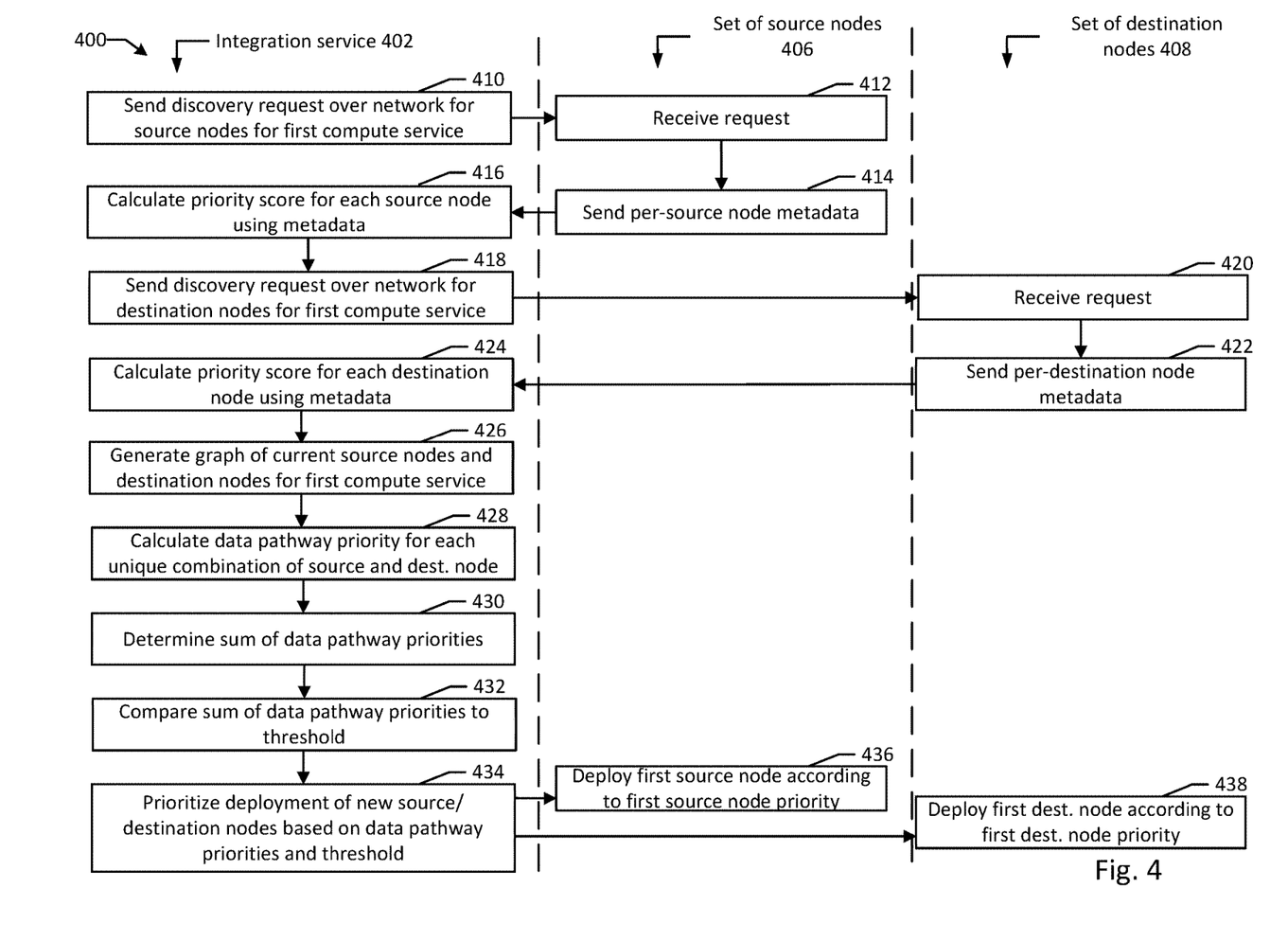
FIG. 4 illustrates a flow diagram of an example prioritization of source node and destination node prioritization, in accordance with various aspects of the present disclosure.

FIG. 4 illustrates a flow diagram 400 of an example prioritization of source node and destination node prioritization, in accordance with various aspects of the present disclosure. Although the examples below are described with reference to the flow diagram illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

Integration service 402 may send a discovery request over a network for source nodes for the first compute service (block 410). The discovery request may specify various conditions (e.g., provide all new source nodes that were created in the past 5 days, provide all tables that were added to a particular database since the last discovery request, etc.). The various systems and/or services communicating on the relevant network may receive the discovery request (block 412) and may send per-source node metadata (block 414) for the set of source nodes 406 in response to the discovery request. In various examples, the discovery request may specify the metadata to be returned in response to the request. For example, the metadata may indicate the amount of data in each relevant folder, the number of new users meeting a specified criteria, etc.

The integration service 402 (and/or the integration priority engine 142 of the integration service 402) may calculate the priority score for each source node using the metadata (block 416). The priority score for the source nodes may be calculated according to source node priority score calculation logic that was either selected by, or supplied by, the first compute service 144 (for which integration is being performed). The integration service 402 may send a discovery request over the network for destination nodes for the first compute service (block 418). The discovery request may specify various conditions (e.g., service priority levels, hardware requirements, etc.). The various systems and/or services communicating on the relevant network may receive the discovery request (block 420) and may send per-destination node metadata (block 422) for the set of destination nodes 408 in response to the discovery request. In various examples, the discovery request may specify the metadata to be returned in response to the request. For example, the metadata may indicate the various hardware classes, the throughput, the current CPU load, the write speed to disk, etc.

The integration service 402 (and/or the integration priority engine 142 of the integration service 402) may calculate the priority score for each destination node using the metadata (block 424). The priority score for the destination nodes may be calculated according to destination node priority score calculation logic that was either selected by, or supplied by, the first compute service 144 (for which integration is being performed). The destination node priority score calculation logic may be different from the source node priority score calculation logic.

The integration service 402 may generate a graph (e.g., graph data) of current source nodes and destination nodes for the first compute service (block 426). The graph may include edges representing data pathways between each respective source node and each destination node. The integration service 402 may calculate data pathway priority for each unique combination of source node and destination node (block 428). For each edge connecting a source node to a destination node, the integration service 402 may add the source node priority to the destination node priority to determine a priority score for the edge/data pathway.

The integration service 402 may determine a sum of the data pathway priorities (block 430). For example, the priority score for each data pathway may be added together to determine a sum. The sum of the data pathway priority scores may be compared to a threshold priority score (block 432). The threshold priority score may represent a budget of compute resource deployment for the first compute service.

Integration service 402 may prioritize deployment of new source/destination nodes based on the data pathway priorities and the threshold (block 434). For example, the sum of the data pathway priority scores may be compared to the threshold. In various examples, the source nodes and destination nodes associated with the highest priority data pathway scores may be deployed with the caveat that the sum of the data pathway priority scores for the deployed nodes should not exceed the threshold priority score. In an example, if there are four data pathways with the data pathway priority scores 7, 5, 4, and 3, the sum of the data pathway priority scores is 19. In the example, the threshold priority score may be 16. Accordingly, the lowest priority data pathway (having the data pathway priority score of 3) may not be deployed so that the sum of the data pathway priority scores for deployed data pathways is 16, equaling the threshold priority score.

At block 436, a first source node may be deployed according to the first source node priority score. In at least some examples, the first source node may be deployed using an integration template that specifies the relevant endpoints and/or conditions associated with the first source node. The endpoints may include specification of HTTP addresses, ports, file paths, etc., for the first source node. Conditions may specify conditions that should be satisfied before retrieving data and/or for selecting the data to be provided to the first compute service 144.

At block 438, a first destination node may be deployed according to the first destination node priority score. In at least some examples, the first destination node may be deployed using an integration template that specifies the relevant endpoints and/or conditions associated with the first destination node. The endpoints may include specification of HTTP addresses, ports, file paths, etc., for the first destination node. Conditions may specify conditions that should be satisfied before sending data to the destination node from the first compute service 144.

Figure 5:
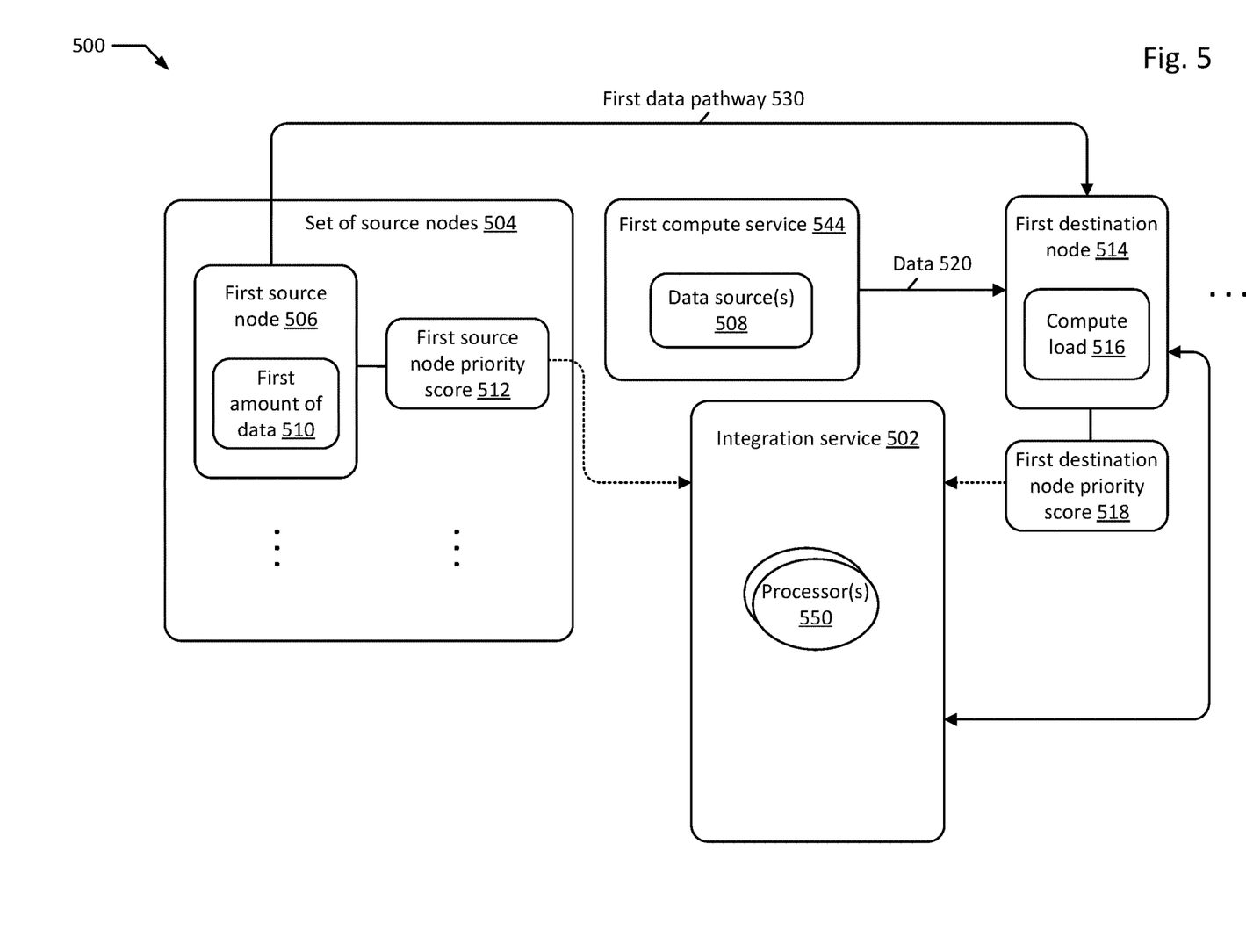
FIG. 5 is block diagram of a system configured to perform dynamic application integration, according to an example of the present disclosure.

FIG. 5 is block diagram of a system 500 configured to perform dynamic application integration, according to an example of the present disclosure. The system 500 comprises a first compute service 544 and an integration service 502. The integration service 502 comprises at least one processor 550. The at least one processor 550 may be effective to determine, for the first compute service 544, a set of source nodes 504. The set of source nodes 504 may be determined using a network broadcast discovery request configured to determine candidate source nodes for the first compute service 544. Candidate source nodes may be those compute nodes that satisfy one or more conditions provided to integration service 502 by first compute service 544 (and/or by an administrator of first compute service 544). Each source node of the set of source nodes 504 may be designated as a potential data source 508 for the first compute service 544.

The at least one processor 550 may be further effective to determine for a first source node 506 of the set of source nodes 504 a first source node priority score 512a based at least in part on a first amount of data 510 to be sent to the first compute service 544 by the first source node 506 upon integration of the first source node 506.

Similarly, the at least one processor 550 may be further effective to determine respective node priority scores for any candidate source nodes among the set of source nodes 504. In some cases, such node priority scores may be determined based at least in part on an amount of data to be sent to the first compute service 544 by the candidate source node for which the priority score is being determined.

The at least one processor 550 may be further effective to determine, for a first destination node 514 that is designated to receive data 520 from the first compute service 544, a first destination node priority score 518 based at least in part on a compute load 516 on the first destination node 514. The compute load 516 may represent and/or be based on a percentage of CPU, memory, disk, and/or input/output currently being consumed by the processes of the first destination node 514.

In various examples, the at least one processor 550 may combine the first source node priority score 512 and the first destination node priority score 518 to determine a first priority score for a first data pathway 530 between the first source node 506a and the first destination node 514. Similarly, the at least one processor 550 may combine the source node priority scores for each candidate source node among set of source nodes 504 and the first destination node priority score 518 to determine priority scores for data pathways between the various candidate source nodes and the first destination node 514. In various further examples, the at least one processor 550 may prioritize deployment of the first data pathway 530 from the first source node 506 to the first destination node 514 based at least in part on the first source node priority score 512 and the first destination node priority score 518. The particular prioritization and/or optimization techniques used may be specific to the desired implementation, although various examples are described above.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   determining a set of source nodes, wherein each source node of the set of source nodes is designated as a data source for a first compute service;
   determining, for a first source node of the set of source nodes, a first source node priority score based at least in part on a first amount of data to be sent to the first compute service by the first source node;
   determining, for a first destination node designated to receive data from the first compute service, a first destination node priority score based at least in part on a compute load on the first destination node; and
   prioritizing deployment of a first data pathway from the first source node to the first destination node based at least in part on the first source node priority score and the first destination node priority score.

2. The method of claim 1, further comprising:
   determining, for a second source node of the set of source nodes, a second source node priority score based at least in part on a second amount of data to be sent to the first compute service by the second source node;
   combining the first source node priority score and the first destination node priority score to determine a first priority score; and
   combining the second source node priority score and the first destination node priority score to determine a second priority score, wherein the deployment of the first data pathway is prioritized further based at least in part on a comparison of the first priority score and the second priority score.

3. The method of claim 1, further comprising:
   sending a request over a network for a set of destination nodes for the first compute service;
   receiving one or more responses to the request; and
   determining, based at least in part on the one or more responses, a set of destination nodes comprising the first destination node, wherein each destination node of the set of destination nodes is designated to receive data from the first compute service.

4. The method of claim 1, wherein the first source node priority score and the first destination node priority score are determined at a first time, the method further comprising:
   determining, at a second time following the first time, an updated first source node priority score based at least in part on a second amount of data to be sent to the first compute service by the first source node at the second time;
   determining, at the second time following the first time, an updated first destination node priority score based at least in part on an updated compute load on the first destination node at the second time;
   combining the updated first source node priority score and the updated first destination node priority score to determine a combined priority score; and
   prioritizing deployment of a second data pathway from the second source node to the first destination node based at least in part on the combined priority score.

5. The method of claim 1, wherein the first source node priority score and the first destination node priority score are determined at a first time, the method further comprising:
   determining that a new source node is available at a second time following the first time; and
   determining a second source node priority score for the new source node based at least in part on a second amount of data to be sent to the first compute service by the new source node.

6. The method of claim 1, further comprising:
determining, for a second source node of the set of source nodes, a second source node priority score based at least in part on a second amount of data to be sent to the first compute service by the second source node;
combining the first source node priority score and the first destination node priority score to determine a first priority score;
combining the second source node priority score and the first destination node priority score to determine a second priority score;
determining a threshold priority score;
determining a sum of at least the first priority score and the second priority score;
comparing the sum to the threshold priority score; and
prioritizing the deployment of the first data pathway based at least in part on the comparison of the sum to the threshold priority score.

7. The method of claim 6, further comprising:
determining a lowest priority score among priority scores associated with current data pathways of the first compute service, the lowest priority score associated with a second data pathway; and
delaying data transmission along the second data pathway based at least in part on the sum exceeding the threshold priority score.

8. The method of claim 1, wherein a discovery request for new source nodes and new destination nodes is sent during runtime of the first compute service.

9. The method of claim 1, further comprising:
sending a discovery request for new source nodes during runtime of the first compute service;
receiving a response indicating a new source node for the first compute service;
generating an integration template for the new source node, the integration template describing an amount of data to be sent by the new source node;
determining a source node priority score for the new source node; and
determining a respective pathway priority score for the new source node for a plurality of candidate destination nodes based at least in part on the source node priority score.

10. The method of claim 1, further comprising determining a condition for the first source node, wherein the first source node determines the first amount of data based on evaluation of the condition.

11. The method of claim 1, further comprising:
generating first graph data for the first compute service, the graph data defining each source node and each destination node for the first compute service at a first time; and
determining for each unique pair of source and destination nodes among the first graph data, a respective priority score, wherein the first priority score is determined for the first data pathway.

12. A system comprising:
a first compute service; and
an integration service comprising at least one processor, the at least one processor effective to:
determine, for the first compute service, a set of source nodes, wherein each source node of the set of source nodes is designated as a data source for the first compute service;
determine, for a first source node of the set of source nodes, a first source node priority score based at least in part on a first amount of data to be sent to the first compute service by the first source node;
determine, for a first destination node designated to receive data from the first compute service, a first destination node priority score based at least in part on a compute load on the first destination node;
prioritize deployment of a first data pathway from the first source node to the first destination node based at least in part on the first source node priority score and the first destination node priority score.

13. The system of claim 12, wherein the at least one processor is further effective to:
determine, for a second source node of the set of source nodes, a second source node priority score based at least in part on a second amount of data to be sent to the first compute service by the second source node;
combine the first source node priority score and the first destination node priority score to determine a first priority score; and
combine the second source node priority score and the first destination node priority score to determine a second priority score, wherein the deployment of the first data pathway is prioritized further based at least in part on a comparison of the first priority score and the second priority score.

14. The system of claim 12, wherein the at least one processor is further effective to:
send a request over a network for a set of destination nodes for the first compute service;
receive one or more responses to the request; and
determine, based at least in part on the one or more responses, a set of destination nodes comprising the first destination node, wherein each destination node of the set of destination nodes is designated to receive data from the first compute service.

15. The system of claim 12, wherein the first source node priority score and the first destination node priority score are determined at a first time, and wherein the at least one processor is further effective to:
determine, at a second time following the first time, an updated first source node priority score based at least in part on a second amount of data to be sent to the first compute service by the first source node at the second time;
determine, at the second time following the first time, an updated first destination node priority score based at least in part on an updated compute load on the first destination node at the second time;
combine the updated first source node priority score and the updated first destination node priority score to determine a combined priority score; and
prioritize deployment of a second data pathway from the second source node to the first destination node based at least in part on the combined priority score.

16. The system of claim 12, wherein the first source node priority score and the first destination node priority score are determined at a first time and the integration service is further effective to:
determine that a new source node is available at a second time following the first time; and
determine a second source node priority score for the new source node based at least in part on a second amount of data to be sent to the first compute service by the new source node.

17. The system of claim 12, wherein the integration service is further effective to:

determine, for a second source node of the set of source nodes, a second source node priority score based at least in part on a second amount of data to be sent to the first compute service by the second source node;

combine the first source node priority score and the first destination node priority score to determine a first priority score;

combine the second source node priority score and the first destination node priority score to determine a second priority score determine a threshold priority score;

determine a sum of at least the first priority score and the second priority score;

compare the sum to the threshold priority score; and prioritize the deployment of the first data pathway based at least in part on the comparison of the sum to the threshold priority score.

18. A non-transitory machine readable medium storing a program, which when executed by at least one processor, is effective to:

determine, for a first compute service, a set of source nodes, wherein each source node of the set of source nodes is designated as a data source for the first compute service;

determine, for a first source node of the set of source nodes, a first source node priority score based at least in part on a first amount of data to be sent to the first compute service by the first source node;

determine, for a first destination node designated to receive data from the first compute service, a first destination node priority score based at least in part on a compute load on the first destination node;

prioritize deployment of a first data pathway from the first source node to the first destination node based at least in part on the first source node priority score and the first destination node priority score.

19. The non-transitory machine readable medium of claim 18, which, when executed by the at least one processor, is further effective to:

determine, for a second source node of the set of source nodes, a second source node priority score based at least in part on a second amount of data to be sent to the first compute service by the second source node;

combine the first source node priority score and the first destination node priority score to determine a first priority score; and combine the second source node priority score and the first destination node priority score to determine a second priority score, wherein the deployment of the first data pathway is prioritized further based at least in part on a comparison of the first priority score and the second priority score.

20. The non-transitory machine readable medium of claim 18, which, when executed by the at least one processor, is further effective to:

send a request over a network for a set of destination nodes for the first compute service;

receive one or more responses to the request; and determine, based at least in part on the one or more responses, a set of destination nodes comprising the first destination node, wherein each destination node of the set of destination nodes is designated to receive data from the first compute service.

* * * * *